United States Patent
Hu et al.

(10) Patent No.: US 12,464,402 B2
(45) Date of Patent: Nov. 4, 2025

(54) SYSTEMS AND METHODS OF WIRELESS TRIGGER FRAMES USING TRANSMISSION IDENTIFIERS

(71) Applicant: Meta Platforms Technologies, LLC, Menlo Park, CA (US)

(72) Inventors: Chunyu Hu, Saratoga, CA (US); Chittabrata Ghosh, Fremont, CA (US); Muhammad Kumail Haider, Sunnyvale, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 380 days.

(21) Appl. No.: 17/841,589

(22) Filed: Jun. 15, 2022

(65) Prior Publication Data

US 2023/0025546 A1    Jan. 26, 2023

Related U.S. Application Data

(60) Provisional application No. 63/222,586, filed on Jul. 16, 2021.

(51) Int. Cl.
*H04W 4/00* (2018.01)
*H04W 28/02* (2009.01)
(Continued)

(52) U.S. Cl.
CPC ....... *H04W 28/0268* (2013.01); *H04W 28/16* (2013.01); *H04W 72/54* (2023.01)

(58) Field of Classification Search
CPC . H04W 28/0268; H04W 28/16; H04W 72/54; H04W 24/10; H04W 28/02; H04W 84/12; Y02D 30/70
(Continued)

(56) References Cited

U.S. PATENT DOCUMENTS

2016/0100408 A1   4/2016   Hedayat
2016/0323426 A1   11/2016  Hedayat
(Continued)

FOREIGN PATENT DOCUMENTS

| EP | 1739900 A1 | 1/2007 |
| EP | 1908233 A1 | 4/2008 |
| WO | 2016176680 A1 | 11/2016 |

OTHER PUBLICATIONS

"26 High-efficiency (HE) MAC Specification (11ax) 26.1 Introduction," IEEE Draft; REVME_CL_26.FM, Jun. 29, 2021, pp. 1-183, retrieved from the Internet URL: http://www.ieee802.org/11/private/Draft_Standards/11me/REVMe_D0.1.rtf.zipREVMe_C1_26.fm.rtf.
(Continued)

*Primary Examiner* — Chuong T Ho
(74) *Attorney, Agent, or Firm* — Foley & Lardner LLP

(57) ABSTRACT

A device may include one or more processors configured to determine a first traffic identifier of a first wireless traffic stream, from a plurality of traffic identifiers. The one or more processors may be configured to generate a first frame including the first traffic identifier. The first frame may be to trigger a receiver device to send a response frame that includes quality of service (QoS) data corresponding to the first wireless traffic stream. The one or more processors may be configured to wirelessly transmit, via a transmitter, the generated first frame to the receiver device.

18 Claims, 9 Drawing Sheets

(51) Int. Cl.
*H04W 28/16* (2009.01)
*H04W 72/54* (2023.01)

(58) Field of Classification Search
USPC .......................................... 370/329, 330, 328
See application file for complete search history.

(56) References Cited

U.S. PATENT DOCUMENTS

| | | | |
|---|---|---|---|
| 2016/0374093 | A1 | 12/2016 | Asterjadhi et al. |
| 2017/0257196 | A1 | 9/2017 | Ghosh et al. |
| 2017/0311310 | A1 | 10/2017 | Ryu et al. |
| 2017/0332385 | A1 | 11/2017 | Shirali et al. |
| 2018/0020372 | A1 | 1/2018 | Viger et al. |
| 2018/0020460 | A1 | 1/2018 | Hedayat |
| 2019/0208571 | A1* | 7/2019 | Ahn ................ H04L 5/0055 |
| 2019/0246312 | A1 | 8/2019 | Kim et al. |
| 2019/0261402 | A1 | 8/2019 | Asterjadhi et al. |
| 2020/0068585 | A1 | 2/2020 | Yoshikawa |
| 2020/0214036 | A1 | 7/2020 | Min et al. |
| 2020/0322105 | A1 | 10/2020 | Chitrakar et al. |
| 2021/0076251 | A1* | 3/2021 | Ho ................... H04L 69/324 |
| 2021/0195460 | A1 | 6/2021 | Park et al. |
| 2021/0240783 | A1 | 8/2021 | Ricci |
| 2021/0360646 | A1* | 11/2021 | Chu ................... H04W 72/569 |
| 2022/0070772 | A1* | 3/2022 | Ho ................... H04W 74/0816 |
| 2022/0201718 | A1 | 6/2022 | Zhou et al. |
| 2022/0231797 | A1* | 7/2022 | Song ................... H04L 1/188 |
| 2022/0386372 | A1* | 12/2022 | Xin ................... H04W 52/0216 |
| 2023/0021113 | A1* | 1/2023 | Shafin ............... H04W 52/0216 |
| 2023/0022424 | A1 | 1/2023 | Hu et al. |
| 2023/0128479 | A1 | 4/2023 | Jang et al. |
| 2023/0140556 | A1* | 5/2023 | Ko ................... H04L 1/1685 |
| | | | 370/329 |
| 2023/0156678 | A1 | 5/2023 | Nakano et al. |
| 2023/0308938 | A1* | 9/2023 | Sun ................... H04W 76/15 |
| 2024/0064865 | A1* | 2/2024 | Ahn ................ H04W 74/0808 |

OTHER PUBLICATIONS

"802 11 Working Group of the LAN/MAN Standards Committee of the IEEE Computer Society," IEEE Draft, IEEE P802.11ax/D5.0, Oct. 5, 2019, pp. 1-772, retrieved from the Internet URL: http://www.ieee802.org/11/private/Draft_Standards/11ax/Draft%20P802.11ax_D5.0.pdf.

International Preliminary Report on Patentability for International Application No. PCT/US2022/037215, mailed Jan. 25, 2024, 8 pages.

International Preliminary Report on Patentability for International Application No. PCT/US2022/037305, mailed Jan. 25, 2024, 8 pages.

International Search Report and Written Opinion for International Application No. PCT/US2022/037215, mailed Nov. 2, 2022, 12 pages.

International Search Report and Written Opinion for International Application No. PCT/US2022/037305, mailed Oct. 27, 2022, 10 pages.

International Search report and Written Opinion for International Application No. PCT/US2022/037333, mailed Oct. 19, 2022, 12 pages.

Kuran M.S., et al., "Throughput-Maximizing OFDMA Scheduler for IEEE 802.11ax Networks," 2020 IEEE 31st Annual International Symposium On Personal, Indoor And Mobile Radio Communications, Aug. 31, 2020, XP033837697, pp. 1-7.

Office Action mailed Aug. 7, 2025 for Taiwan Application No. 111125952, filed Jul. 11, 2022, 12 pages.

Office Action mailed Sep. 8, 2025 for Taiwan Application No. 111125951, filed Jul. 11, 2022, 6 pages.

* cited by examiner

| Trigger Type subfield value | Trigger frame variant |
|---|---|
| 0 | Basic |
| 1 | Beamforming Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll (NFRP) |
| 8-15 | Reserved |

FIG. 5

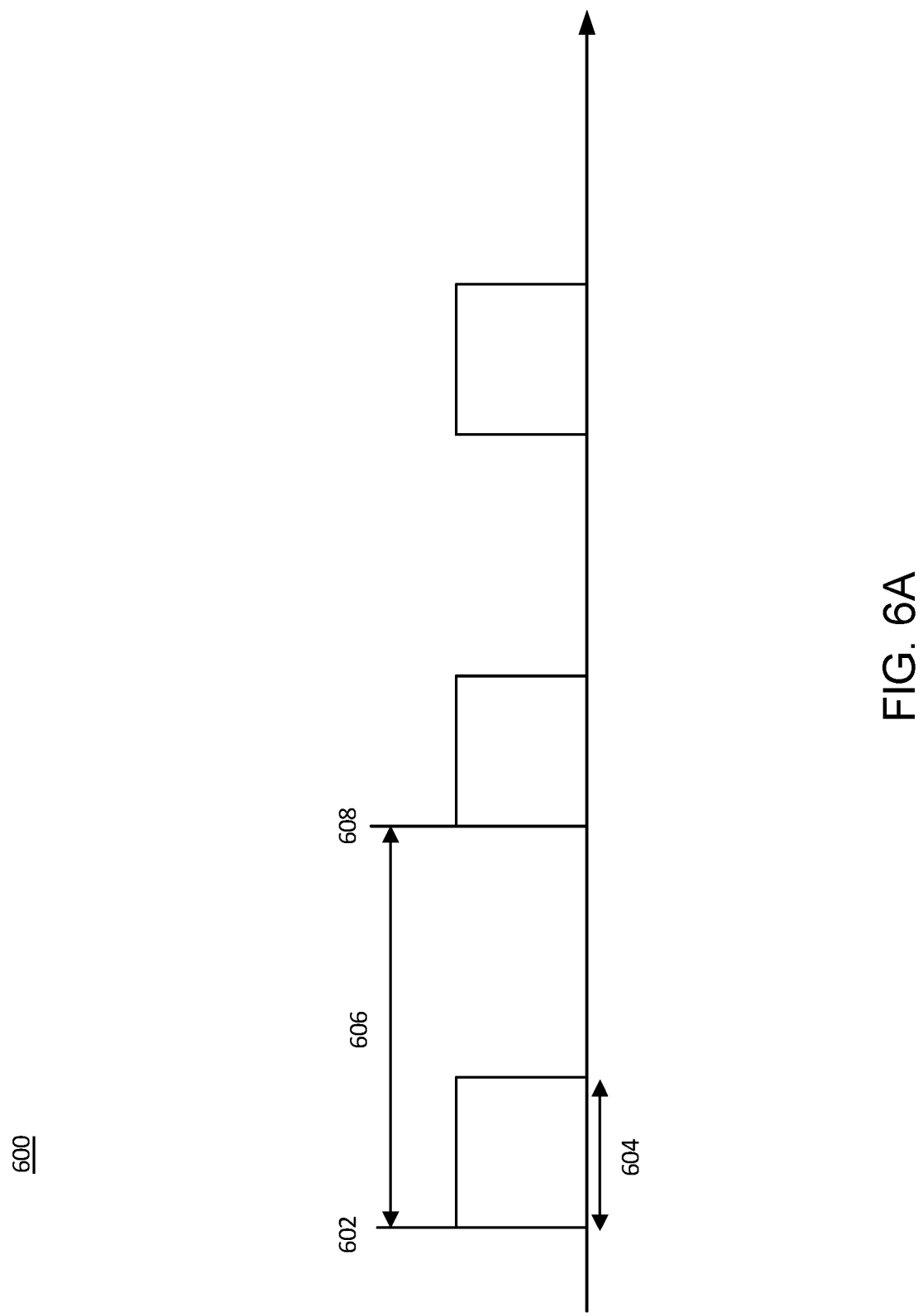

SYSTEMS AND METHODS OF WIRELESS TRIGGER FRAMES USING TRANSMISSION IDENTIFIERS

CROSS-REFERENCE TO RELATED APPLICATION

This application claims priority to U.S. Provisional Patent Application No. 63/222,586 filed on Jul. 16, 2021, which is incorporated by reference herein in its entirety for all purposes.

FIELD OF DISCLOSURE

The present disclosure is generally related to communications, including but not limited systems and methods of triggering reporting and/or sending reporting for transmission streams.

BACKGROUND

Artificial reality such as a virtual reality (VR), an augmented reality (AR), or a mixed reality (MR) provides immersive experience to a user. In one example, a user wearing a head wearable display (HWD) can turn the user's head, and an image of a virtual object corresponding to a location of the HWD and a gaze direction of the user can be displayed on the HWD to allow the user to feel as if the user is moving within a space of artificial reality (e.g., a VR space, an AR space, or a MR space). An image of a virtual object may be generated by a console communicatively coupled to the HWD. In some embodiments, the console may have access to a network.

SUMMARY

Various embodiments disclosed herein are related to a device including one or more processors. In some embodiments, the one or more processors may be configured to determine a first traffic identifier of a first wireless traffic stream, from a plurality of traffic identifiers. The one or more processors may be configured to generate a first frame including the first traffic identifier. The first frame may be to trigger a receiver device to send a response frame that includes quality of service (QoS) data corresponding to the first wireless traffic stream. The one or more processors may be configured to wirelessly transmit, via a transmitter, the generated first frame to the receiver device.

In some embodiments, in generating the first frame, the one or more processors may be configured to determine whether a first field of the first frame is set to a first value. In response to determining that the first field is set to the first value, the one or more processors may be configured to set a second field of the first frame to indicate the first traffic identifier. The first field may be a subfield of a user information field that is associated with a particular user or the receiving device. In generating the first frame, the one or more processors may be configured to determine whether a third field of the first frame is set to a second value. In response to determining that the first field is set to the first value and the third field is set to the second value, the one or more processors may be configured to set a first bit of a fourth field of the first frame to indicate the first traffic identifier. The fourth field of the first frame may include a plurality of bits each corresponding to a traffic identifier associated with one of a plurality of traffic categories.

In some embodiments, in generating the first frame, the one or more processors may be configured to set a frame type field of the first frame to a first type indicating a trigger frame including one or more traffic identifiers, and set a traffic identifier field of the first frame to the first traffic identifier.

In some embodiments, in generating the first frame, the one or more processors are configured to set a frame type field of the first frame to a second type indicating a trigger frame including one or more traffic identifiers, and set a first bit of a traffic identifier bitmap field of the first frame to indicate the first traffic identifier. The traffic identifier bitmap field of the first frame may include a plurality of bits each corresponding to a traffic identifier associated with one of a plurality of traffic categories.

In some embodiments, in generating the first frame, the one or more processors may be configured to set a second field of the first frame to the first traffic identifier, when the first frame is to be wirelessly transmitted during a service period (SP) of a target wake time (TWT) schedule. The TWT schedule may be a restricted TWT schedule.

Various embodiments disclosed herein are related to a method including determining, by a first device, a first traffic identifier of a first wireless traffic stream, from a plurality of traffic identifiers. In some embodiments, the method may include generating a first frame including the first traffic identifier. The first frame may be to trigger a receiver device to send a response frame that comprises quality of service (QoS) data corresponding to the first wireless traffic stream. The method may include wirelessly transmitting, via a transmitter, the generated first frame to the receiver device.

In some embodiments, in generating the first frame, the first device may determine whether a first field of the first frame is set to a first value. In response to determining that the first field is set to the first value, the first device may set a second field of the first frame to indicate the first traffic identifier. The first field may be a subfield of a user information field that is associated with a particular user or the receiving device. In generating the first frame, the first device may determine whether a third field of the first frame is set to a second value. In response to determining that the first field is set to the first value and the third field is set to the second value, the first device may set a first bit of a fourth field of the first frame to indicate the first traffic identifier. The fourth field of the first frame may include a plurality of bits each corresponding to a traffic identifier associated with one of a plurality of traffic categories.

In some embodiments, in generating the first frame, the first device may set a frame type field of the first frame to a first type indicating a trigger frame including one or more traffic identifiers, and set a traffic identifier field of the first frame to the first traffic identifier.

In some embodiments, in generating the first frame, the first device may set a frame type field of the first frame to a second type indicating a trigger frame including one or more traffic identifiers, and set a first bit of a traffic identifier bitmap field of the first frame to indicate the first traffic identifier. The traffic identifier bitmap field of the first frame may include a plurality of bits each corresponding to a traffic identifier associated with one of a plurality of traffic categories.

In some embodiments, in generating the first frame, the first device may set a second field of the first frame to the first traffic identifier, when the first frame is to be wirelessly transmitted during a service period (SP) of a target wake time (TWT) schedule. The TWT schedule may be a restricted TWT schedule.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

FIG. 5 is a table of trigger frame types/variants (e.g., encoding trigger frame formats), according to an example implementation of the present disclosure.

FIGS. 6A-6B are timing diagrams each showing a wake-up/sleep schedule of a computing device utilizing target wake time (TWT), according to an example implementation of the present disclosure.

DETAILED DESCRIPTION

Figure 1:
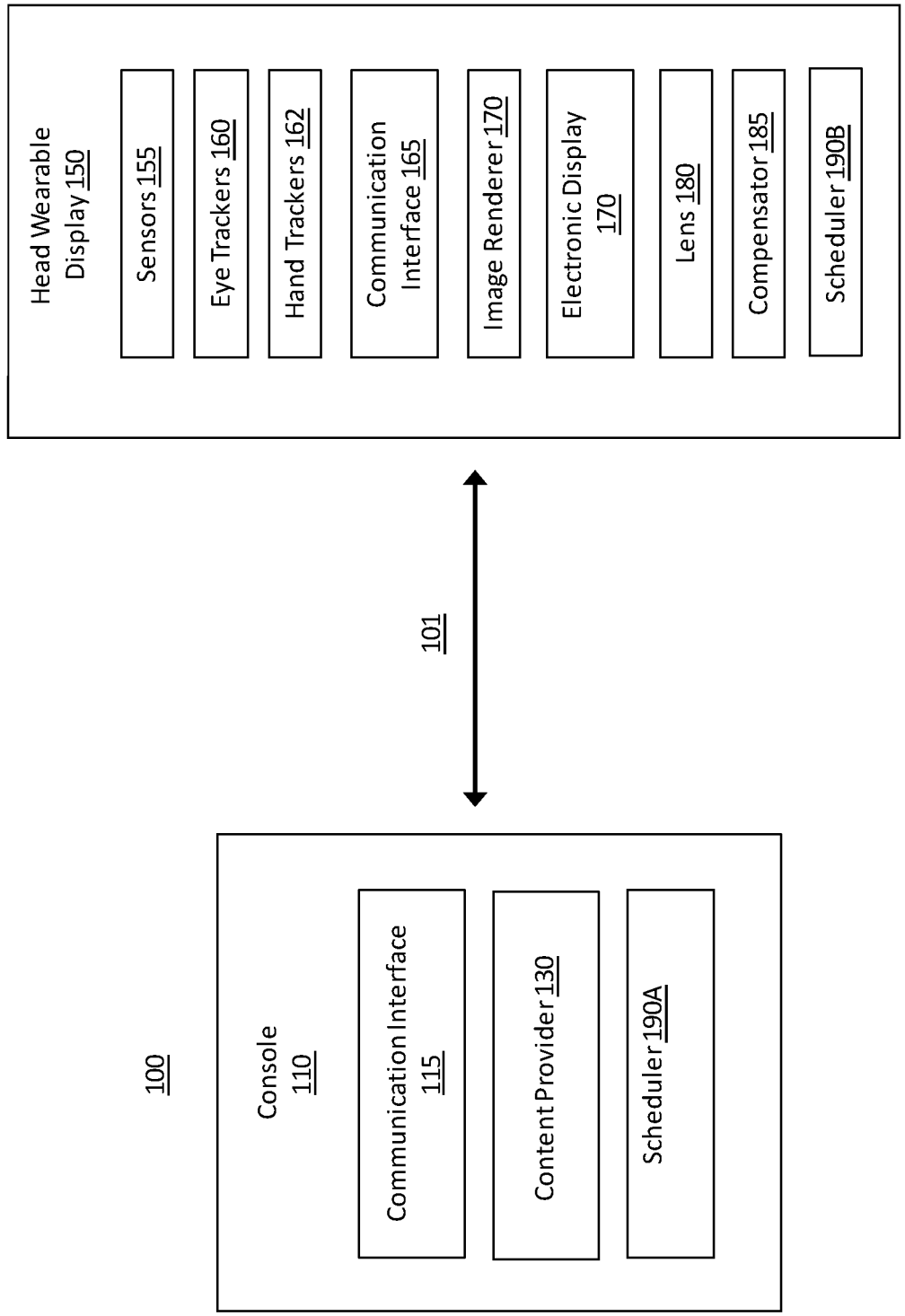
FIG. 1 is a diagram of a system environment including an artificial reality system, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are systems and methods related to triggering (e.g., requesting, activating and/or initiating) reporting and/or sending (e.g., generating, and/or transmitting) reporting for transmission streams. In some embodiments, a device may include one or more processors. The one or more processors may determine a first traffic identifier (sometimes referred to as traffic stream identifier or TID) of a first wireless traffic stream, from a plurality of traffic identifiers. The one or more processors may generate a first frame including (e.g., incorporating, including) the first traffic identifier. The first frame may be to trigger a receiver device to send a response frame that includes quality of service (QoS) data corresponding to the first wireless traffic stream. The one or more processors may wirelessly transmit, via a transmitter, the generated first frame to the receiver device. QoS data may be data corresponding to a stream with a specified QoS, which is the key attribute of the response frame.

Streams of traffic may be characterized by different types of traffic (e.g., traffic types of video (VI), voice (VO), best effort (BE), background (BK)). For instance, an application may be characterized by latency sensitive traffic or regular traffic. Latency sensitive traffic may be identifiable, in part, based on its periodicity or periodic nature (e.g., periodic bursts of traffic) and low latency requirement, in some embodiments. For instance, video display traffic may be driven by a refresh rate of 60 Hz, 72 Hz, 90 Hz, or 120 Hz. An application and/or device may have combinations of traffic types (e.g., latency sensitive traffic and non-latency sensitive traffic). Further, each stream of traffic for the application and/or device may be more or less spontaneous and/or periodic as compared to other streams of traffic for the application and/or device. Accordingly, traffic may vary according to applications and/or channel rate dynamics.

In some implementations, devices may provide different quality of services (QoS) using different links, frames, time slots, and the like. For example, a device (such as an access point (AP)) may prioritize some slots, frames, or packets over other slots, frames, or packets. In some applications, latency sensitive traffic that is not prioritized (e.g., to be processed or handled in a defined manner) may degrade a user experience. For example, in an AR context, latency between a movement of a user wearing an AR device and an image corresponding to the user movement and displayed to the user using the AR device may cause judder, resulting in motion sickness.

In some implementations, a basic Trigger frame may include a Preferred Access Categories (AC) subfield in a trigger dependent user info subfield of a per user info field. The Preferred AC subfield may indicate a lowest AC that may be recommended for aggregation of Medium Access Control (MAC) Protocol Data Unit (MPDU) in an Aggregated-MPDU contained in a high efficiency (HE) or extremely high throughput (EHT) trigger based (TB) physical layer protocol data unit (PPDU) sent as a response to the Trigger frame. The Preferred AC subfield may be encoded according to access category index (ACI)-to-AC encoding. Using this Trigger frame format, uplink (UL) QoS-data frames may be triggered by a basic Trigger frame. For example, an AP may transmit a Trigger frame to a list of intended non-AP stations (STAs) with their access identifier (AIDs) identified in an AID subfield of the per user info field of the Trigger frame. The intended non-AP STA may respond with QoS data following the AP's recommended AC indicated in the Preferred AC subfield. A QoS data frame may contain a traffic stream identifier (TID) in a QoS Control subfield of the QoS data frame. Each TID may be mapped into one AC and multiple TIDs can be mapped into one AC.

In some implementations, it would be beneficial to provide a mechanism for an AP to perform the triggering based on TID directly. For example, a restricted target wake time (TWT) (R-TWT or rTWT) agreement may be established between two STAs with one or more TIDs to be associated with traffic of each direction. When an AP triggers a non-AP STA during rTWT service periods (SPs), the AP may trigger specific TID(s) that are associated with this rTWT agreement.

To solve this problem, according to certain aspects, embodiments in the present disclosure relate to techniques for providing a mechanism for a device (e.g., AP) to trigger based on TID directly. In some embodiments, a Trigger frame may allow the AP to trigger reporting based on TID.

In one approach, a basic Trigger frame may be extended using a reserved field of the per user info field as a trigger TID subfield. The reserved field may have a size of one or more bits. In some embodiments, the reserved field may be set to a value of 0 or 1. If the trigger TID subfield is set to 1 (for example; or to another defined value), then a type dependent per user info field (or trigger dependent user info field) for a basic trigger may be defined to have a Preferred TID subfield which has a size of three or more bits. In some embodiments, bit 5 to bit 7 of the type dependent per user info field may correspond to the Preferred TID subfield, and bit 0 to bit 4 may correspond to subfields of MPDU multi-user (MU) spacing factor (2 bits) and/or TID Aggregation Limit (3 bits).

In some embodiments, if (1) the trigger TID subfield is set to 1 (for example; or to another defined value) and (2) a multi-TID Aggregation Tx Support subfield in a HE MAC Capabilities field is set to 0 (for example; or to another defined value) by a STA, then the trigger dependent user info field (for the STA with its AID specified in an AID field (e.g., AID12 field) in the per user info field) for a basic trigger may be defined to include a Preferred TID bitmap subfield which has a size of six or more bits. In some embodiments, bit 2 to bit 7 of the trigger dependent user info field may correspond to the Preferred TID bitmap subfield, and bit 0 to bit 1 may correspond to a subfield of MPDU multi-user (MU) spacing factor (2 bits). In some embodiments, each bit of the Preferred TID bitmap subfield may indicate (if set to 1 for instance) a corresponding one of 6 TIDs belonging to AC_BE (best effort), AC_VI (video), and AC_VO (voice). In some embodiments, each bit in the Preferred TID bitmap subfield may correspond to an order set of TIDs from 2-7 (excluding TIDs 0, 1 from AC_BK (background)). An example of encoding of the Preferred TID bitmap subfield is shown in Table 1.

TABLE 1

Example Encoding of Preferred TID bit map subfield

| Bit Index of Preferred TID bitmap subfield | Corresponding TID |
| --- | --- |
| 0 | 0 (AC_BE) |
| 1 | 3 (AC_BE) |
| 2 | 4 (AC_VI) |
| 3 | 5 (AC_VI) |
| 4 | 6 (AC_VO) |
| 5 | 7 (AC_VO) |

In some embodiments, a QoS-data frame may be triggered based on TID(s) specified in at least one of a Preferred TID subfield or a Preferred TID bitmap subfield defined in a basic Trigger frame. For example, upon receiving a Trigger frame (TF) with the Preferred TID bitmap subfield, a STA may send data in HE or EHT TB PPDU or other types of PPDU from one of the TIDs whose bit is set in the received Preferred TID bitmap subfield.

In one approach, a new Trigger frame type may be defined as an extended version/form of basic Trigger frame, e.g., a basic TID Trigger frame. The basic TID Trigger frame may include a Trigger Type subfield which may be set to a value not used by other (existing) Trigger frame types (e.g., set to 8 which is not used by other Trigger frame types). In some embodiments, the frame format of the basic TID Trigger frame may be the same as that of the basic Trigger frame except that a Preferred TID subfield is defined in the type dependent per user info subfield (or trigger dependent user info subfield). In some embodiments, bit 5 to bit 7 of the type dependent per user info subfield may correspond to the Preferred TID subfield, and bit 0 to bit 4 of the type dependent per user info subfield may correspond to MPDU MU spacing factor (2 bits) and/or TID Aggregation Limit (3 bits).

In some embodiments, a basic TID Trigger frame, whose Trigger Type subfield is set to a value not used by other (existing) Trigger frame types, may include a Preferred TID bitmap subfield in the type dependent per user info subfield. In some embodiments, the frame format of the basic TID Trigger frame may be the same as that of the basic Trigger frame except that the type dependent per user info subfield may be 2 octets (instead of 1 octet), bit 5 to bit 7 may be defined as reserved, and bit 8 to bit 15 may be defined as the Preferred TID bitmap subfield. In some embodiments, bit 8 to bit 15 of the type dependent per user info subfield may correspond to the Preferred TID bitmap subfield, bit 5 to bit 7 of the type dependent per user info subfield may correspond to the reserved subfield, and bit 0 to bit 4 of the type dependent per user info subfield may correspond to MPDU MU spacing factor (2 bits) and/or TID Aggregation Limit (3 bits). In the Preferred TID bitmap subfield, if bit-k is set to 1 for example (k=0, . . . , 7), then TID k may be a recommended TID for aggregation of MPDUs in an Aggregate MAC Protocol Data Unit (A-MPDU) to be included in the HE or EHT TB-PPDU.

In some embodiments, a QoS-data frame may be trigged using a newly defined basic TID Trigger frame instead of a basic Trigger frame. A QoS-data frame may be triggered based on TID(s) specified in the basic TID Trigger frame (e.g., TID(s) specified in at least one of a Preferred TID subfield or a Preferred TID bitmap subfield depending on the frame format of the basic TID Trigger frame). For example, upon receiving a basic TID Trigger frame with the Preferred TID bitmap subfield, a STA may send data in HE or EHT TB PPDU or any other PPDU from one of the TIDs whose bit is set in the received Preferred TID bitmap subfield.

In one approach, a basic Trigger frame may implicitly indicate a preferred TID during a TWT service period (SP). In some embodiments, when a basic Trigger frame is transmitted or received during a TWT SP (e.g., R-TWT SP), a particular portion of the type dependent per user info field of the basic Trigger frame may be set to (or interpreted/configured as) a value indicating a preferred TID, so that upon receiving the basic Trigger frame with the particular portion of the type dependent per user info field, a STA may send data from the preferred TID set in the received particular portion. In some embodiments, the particular portion may correspond to bit 5 to bit 7 in the type dependent per user info field.

In one approach, a device may include one or more processors. The one or more processors may determine a first traffic identifier of a first wireless traffic stream, from a plurality of traffic identifiers. The one or more processors may generate a first frame including the first traffic identifier. The first frame may be to trigger a receiver device to send a response frame that includes quality of service (QoS) data corresponding to the first wireless traffic stream. The one or more processors may wirelessly transmit, via a transmitter, the generated first frame to the receiver device.

In one approach, in generating the first frame, the one or more processors may be configured to determine whether a first field (e.g., Trigger TID subfield) of the first frame is set to a first value. In response to determining that the first field is set to the first value, the one or more processors may be configured to set a second field (e.g., Preferred TID subfield) of the first frame to indicate the first traffic identifier. The first field may be a subfield of a user information field that is associated with a particular user or the receiving device. In generating the first frame, the one or more processors may be configured to determine whether a third field (e.g., multi-TID Aggregation Tx Support subfield in a HE MAC Capabilities field) of the first frame is set to a second value. In response to determining that the first field is set to the first value and the third field is set to the second value, the one or more processors may be configured to set a first bit of a fourth field of the first frame to indicate the first traffic identifier. The fourth field (e.g., TID bitmap subfield) of the first frame may include a plurality of bits each corresponding to a traffic identifier associated with one of a plurality of traffic categories.

In one approach, in generating the first frame, the one or more processors may be configured to set a frame type field of the first frame to a first type indicating a Trigger frame including one or more traffic identifiers, and may set a traffic identifier field of the first frame to the first traffic identifier.

In one approach, in generating the first frame, the one or more processors are configured to set a frame type field of the first frame to a second type indicating a Trigger frame including one or more traffic identifiers, and set a first bit of a traffic identifier bitmap field of the first frame to indicate the first traffic identifier. The traffic identifier bitmap field of the first frame may include a plurality of bits each corresponding to a traffic identifier associated with one of a plurality of traffic categories.

In one approach, in generating the first frame, the one or more processors may be configured to set a second field of the first frame to the first traffic identifier, when the first frame is to be wirelessly transmitted during a service period (SP) of a target wake time (TWT) schedule. The TWT schedule may be a restricted TWT schedule.

Embodiments in the present disclosure have at least the following advantages and benefits.

First, embodiments in the present disclosure can provide useful techniques for providing a mechanism for a device (e.g., an AP) to trigger reporting based on a specific TID directly, thereby differentiating traffic streams with TIDs at a resolution higher than a resolution of differentiating traffic streams with ACs. With this higher resolution traffic differentiation mechanism, particular traffic streams can be identified, resulting in higher resolution frame/link/slot prioritization, increasing/improving QoS.

Second, embodiments in the present disclosure can provide useful techniques for QoS triggering with an improved compliance with a restricted target wake time (TWT) (R-TWT or rTWT) agreement. An R-TWT agreement may be established between two EHT STAB with one or more TIDs to be associated with traffic of each direction. Using a TID-based triggering mechanism according to some embodiments, when an AP triggers a non-AP STA during rTWT service periods (SPs), the AP can trigger specific TID(s) that are associated with this rTWT agreement.

FIG. 1 is a block diagram of an example artificial reality system environment 100 in which a console 110 operates. FIG. 1 provides an example environment in which devices may communicate traffic streams with different latency sensitivities/requirements. In some embodiments, the artificial reality system environment 100 includes a HWD 150 worn by a user, and a console 110 providing content of artificial reality to the HWD 150. A head wearable display (HWD) may be referred to as, include, or be part of a head mounted display (HMD), head mounted device (HMD), head wearable device (HWD), head worn display (HWD) or head worn device (HWD). In one aspect, the HWD 150 may include various sensors to detect a location, an orientation, and/or a gaze direction of the user wearing the HWD 150, and provide the detected location, orientation and/or gaze direction to the console 110 through a wired or wireless connection. The HWD 150 may also identify objects (e.g., body, hand face).

The console 110 may determine a view within the space of the artificial reality corresponding to the detected location, orientation and/or the gaze direction, and generate an image depicting the determined view. The console 110 may also receive one or more user inputs and modify the image according to the user inputs. The console 110 may provide the image to the HWD 150 for rendering. The image of the space of the artificial reality corresponding to the user's view can be presented to the user. In some embodiments, the artificial reality system environment 100 includes more, fewer, or different components than shown in FIG. 1. In some embodiments, functionality of one or more components of the artificial reality system environment 100 can be distributed among the components in a different manner than is described here. For example, some of the functionality of the console 110 may be performed by the HWD 150, and/or some of the functionality of the HWD 150 may be performed by the console 110.

In some embodiments, the HWD 150 is an electronic component that can be worn by a user and can present or provide an artificial reality experience to the user. The HWD 150 may render one or more images, video, audio, or some combination thereof to provide the artificial reality experience to the user. In some embodiments, audio is presented via an external device (e.g., speakers and/or headphones) that receives audio information from the HWD 150, the console 110, or both, and presents audio based on the audio information. In some embodiments, the HWD 150 includes sensors 155, eye trackers 160, a communication interface 165, an image renderer 170, an electronic display 175, a lens 180, and a compensator 185. These components may operate together to detect a location of the HWD 150 and/or a gaze direction of the user wearing the HWD 150, and render an image of a view within the artificial reality corresponding to the detected location of the HWD 150 and/or the gaze direction of the user. In other embodiments, the HWD 150 includes more, fewer, or different components than shown in FIG. 1.

In some embodiments, the sensors 155 include electronic components or a combination of electronic components and software components that detect a location and/or an orientation of the HWD 150. Examples of sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and/or the rotational movement, and determine an orientation and location of the HWD 150. In one aspect, the sensors 155 can detect the translational movement and/or the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the eye trackers 160 include electronic components or a combination of electronic components and software components that determine a gaze direction of the user of the HWD 150. In some embodiments, the HWD 150, the console 110 or a combination may incorporate the gaze direction of the user of the HWD 150 to generate image data for artificial reality. In some embodiments, the eye trackers 160 include two eye trackers, where each eye tracker 160 captures an image of a corresponding eye and determines a gaze direction of the eye. In one example, the eye tracker 160 determines an angular rotation of the eye, a translation of the eye, a change in the torsion of the eye, and/or a change in shape of the eye, according to the captured image of the eye, and determines the relative gaze direction with respect to the HWD 150, according to the determined angular rotation, translation and the change in the torsion of the eye. In one approach, the eye tracker 160 may shine or project a predetermined reference or structured pattern on a portion of the eye, and capture an image of the eye to analyze the pattern projected on the portion of the eye to determine a relative gaze direction of the eye with respect to the HWD 150. In some embodiments, the eye trackers 160 incorporate the orientation of the HWD 150 and the relative gaze direction with respect to the HWD 150 to determine a gaze direction of the user. Assuming for an example that the HWD 150 is oriented at a direction 30 degrees from a reference direction, and the relative gaze direction of the HWD 150 is −10 degrees (or 350 degrees) with respect to the HWD 150, the eye trackers 160 may determine that the gaze direction of the user is 20 degrees from the reference direction. In some embodiments, a user of the HWD 150 can configure the HWD 150 (e.g., via user settings) to enable or disable the eye trackers 160. In some embodiments, a user of the HWD 150 is prompted to enable or disable the eye trackers 160.

In some embodiments, the hand tracker 162 includes an electronic component or a combination of an electronic component and a software component that tracks a hand of the user. In some embodiments, the hand tracker 162 includes or is coupled to an imaging sensor (e.g., camera) and an image processor that can detect a shape, a location and/or an orientation of the hand. The hand tracker 162 may generate hand tracking measurements indicating the detected shape, location and/or orientation of the hand.

In some embodiments, the communication interface 165 includes an electronic component or a combination of an electronic component and a software component that communicates with the console 110. The communication interface 165 may communicate with a communication interface 115 of the console 110 through a communication link. The communication link may be a wireless link, a wired link, or both. Examples of the wireless link can include a cellular communication link, a near field communication link, Wi-Fi, Bluetooth, or any communication wireless communication link. Examples of the wired link can include a USB, Ethernet, Firewire, HDMI, or any wired communication link. In embodiments in which the console 110 and the head wearable display 150 are implemented on a single system, the communication interface 165 may communicate with the console 110 through a bus connection or a conductive trace. Through the communication link, the communication interface 165 may transmit to the console 110 sensor measurements indicating the determined location of the HWD 150, orientation of the HWD 150, the determined gaze direction of the user, and/or hand tracking measurements. Moreover, through the communication link, the communication interface 165 may receive from the console 110 sensor measurements indicating or corresponding to an image to be rendered.

Using the communication interface, the console 110 (or HWD 150) may coordinate operations on link 101 to reduce collisions or interferences. For example, the console 110 may coordinate communication between the console 110 and the HWD 150. In some implementations, the console 110 may transmit a beacon frame periodically to announce/advertise a presence of a wireless link between the console 110 and the HWD 150 (or between two HWDs). In an implementation, the HWD 150 may monitor for or receive the beacon frame from the console 110, and can schedule communication with the HWD 150 (e.g., using the information in the beacon frame, such as an offset value) to avoid collision or interference with communication between the console 110 and/or HWD 150 and other devices.

The console 110 and HWD 150 may communicate using link 101 (e.g., intralink). Data (e.g., a traffic stream) may flow in a direction on link 101. For example, the console 110 may communicate using a downlink (DL) communication to the HWD 150 and the HWD 150 may communicate using an uplink (UL) communication to the console 110.

In some embodiments, the image renderer 170 includes an electronic component or a combination of an electronic component and a software component that generates one or more images for display, for example, according to a change in view of the space of the artificial reality. In some embodiments, the image renderer 170 is implemented as a processor (or a graphical processing unit (GPU)) that executes instructions to perform various functions described herein. The image renderer 170 may receive, through the communication interface 165, data describing an image to be rendered, and render the image through the electronic display 175. In some embodiments, the data from the console 110 may be encoded, and the image renderer 170 may decode the data to generate and render the image. In one aspect, the image renderer 170 receives the encoded image from the console 110, and decodes the encoded image, such that a communication bandwidth between the console 110 and the HWD 150 can be reduced.

In some embodiments, the image renderer 170 receives, from the console, 110 additional data including object information indicating virtual objects in the artificial reality space and depth information indicating depth (or distances from the HWD 150) of the virtual objects. Accordingly, the image renderer 170 may receive from the console 110 object information and/or depth information. The image renderer 170 may also receive updated sensor measurements from the sensors 155. The process of detecting, by the HWD 150, the location and the orientation of the HWD 150 and/or the gaze direction of the user wearing the HWD 150, and generating and transmitting, by the console 110, a high resolution image (e.g., 1920 by 1080 pixels, or 2048 by 1152 pixels) corresponding to the detected location and the gaze direction to the HWD 150 may be computationally exhaustive and may not be performed within a frame time (e.g., less than 11 ms or 8 ms).

In some implementations, the image renderer 170 may perform shading, reprojection, and/or blending to update the image of the artificial reality to correspond to the updated location and/or orientation of the HWD 150. Assuming that a user rotated their head after the initial sensor measurements, rather than recreating the entire image responsive to the updated sensor measurements, the image renderer 170 may generate a small portion (e.g., 10%) of an image corresponding to an updated view within the artificial reality according to the updated sensor measurements, and append the portion to the image in the image data from the console 110 through reprojection. The image renderer 170 may perform shading and/or blending on the appended edges. Hence, without recreating the image of the artificial reality according to the updated sensor measurements, the image renderer 170 can generate the image of the artificial reality.

In other implementations, the image renderer 170 generates one or more images through a shading process and a reprojection process when an image from the console 110 is not received within the frame time. For example, the shading process and the reprojection process may be performed adaptively, according to a change in view of the space of the artificial reality.

In some embodiments, the electronic display 175 is an electronic component that displays an image. The electronic display 175 may, for example, be a liquid crystal display or an organic light emitting diode display. The electronic display 175 may be a transparent display that allows the user to see through. In some embodiments, when the HWD 150 is worn by a user, the electronic display 175 is located proximate (e.g., less than 3 inches) to the user's eyes. In one aspect, the electronic display 175 emits or projects light towards the user's eyes according to image generated by the image renderer 170.

In some embodiments, the lens 180 is a mechanical component that alters received light from the electronic display 175. The lens 180 may magnify the light from the electronic display 175, and correct for optical error associated with the light. The lens 180 may be a Fresnel lens, a convex lens, a concave lens, a filter, or any suitable optical component that alters the light from the electronic display 175. Through the lens 180, light from the electronic display 175 can reach the pupils, such that the user can see the image displayed by the electronic display 175, despite the close proximity of the electronic display 175 to the eyes.

In some embodiments, the compensator 185 includes an electronic component or a combination of an electronic component and a software component that performs compensation to compensate for any distortions or aberrations. In one aspect, the lens 180 introduces optical aberrations such as a chromatic aberration, a pin-cushion distortion, barrel distortion, etc. The compensator 185 may determine a compensation (e.g., predistortion) to apply to the image to be rendered from the image renderer 170 to compensate for the distortions caused by the lens 180, and apply the determined compensation to the image from the image renderer 170. The compensator 185 may provide the predistorted image to the electronic display 175.

In some embodiments, the console 110 is an electronic component or a combination of an electronic component and a software component that provides content to be rendered to the HWD 150. In one aspect, the console 110 includes a communication interface 115 and a content provider 130. These components may operate together to determine a view (e.g., a field of view (FOV) of the user) of the artificial reality corresponding to the location of the HWD 150 and/or the gaze direction of the user of the HWD 150, and can generate an image of the artificial reality corresponding to the determined view. In other embodiments, the console 110 includes more, fewer, or different components than shown in FIG. 1. In some embodiments, the console 110 is integrated as part of the HWD 150. In some embodiments, the communication interface 115 is an electronic component or a combination of an electronic component and a software component that communicates with the HWD 150. The communication interface 115 may be a counterpart component to the communication interface 165 to communicate with a communication interface 115 of the console 110 through a communication link (e.g., USB cable, a wireless link). Through the communication link, the communication interface 115 may receive from the HWD 150 sensor measurements indicating the determined location and/or orientation of the HWD 150, the determined gaze direction of the user, and/or hand tracking measurements. Moreover, through the communication link, the communication interface 115 may transmit to the HWD 150 data describing an image to be rendered.

The content provider 130 can include or correspond to a component that generates content to be rendered according to the location and/or orientation of the HWD 150, the gaze direction of the user and/or hand tracking measurements. In one aspect, the content provider 130 determines a view of the artificial reality according to the location and orientation of the HWD 150 and/or the gaze direction of the user of the HWD 150. For example, the content provider 130 maps the location of the HWD 150 in a physical space to a location within an artificial reality space, and determines a view of the artificial reality space along a direction corresponding to an orientation of the HWD 150 and/or the gaze direction of the user from the mapped location in the artificial reality space.

The content provider 130 may generate image data describing an image of the determined view of the artificial reality space, and transmit the image data to the HWD 150 through the communication interface 115. The content provider may also generate a hand model (or other virtual object) corresponding to a hand of the user according to the hand tracking measurement, and generate hand model data indicating a shape, a location, and an orientation of the hand model in the artificial reality space.

In some embodiments, the content provider 130 generates metadata including motion vector information, depth information, edge information, object information, etc., associated with the image, and transmits the metadata with the image data to the HWD 150 through the communication interface 115. The content provider 130 may encode and/or encode the data describing the image, and can transmit the encoded and/or encoded data to the HWD 150. In some embodiments, the content provider 130 generates and provides the image to the HWD 150 periodically (e.g., every one second).

The scheduler 190A of the console 110 may configure a Trigger frame. The Trigger frame may be dependent on the trigger type. Example Trigger frame types include a basic Trigger frame, a beamforming report poll (BFRP) Trigger frame, a multi-user (MU)— block acknowledge request (BAR) Trigger frame, a MU-request to send (RTS) Trigger frame, a buffer status report poll (BSRP) Trigger frame, a group cast with retries (GCR) MU-BAR Trigger frame, a bandwidth query report poll (BQRP) Trigger frame, a null data packet feedback report poll (NFRP) Trigger frame, and the like. The scheduler 190A may encode the Trigger frame types (in a trigger type subfield) in the common information field of a Trigger frame. The scheduler 190A may configure the Trigger frame to be transmitted to multiple devices (e.g., HWD 150). When each device receives the Trigger frame, the devices may decode the Trigger frame to determine whether the frame is directed to the particular device. Details of a Trigger frame format will be described below with reference to FIGS. 4A-5.

Referring back to FIG. 1, if the Trigger frame transmitted via the scheduler 190A of the console 110 is transmitted to a particular device, then the scheduler 190B of the device (e.g., HWD 150) may configure a response. The device may respond to the Trigger frame with QoS data following the recommended format received from the console 110, for instance. In some implementations, the device may respond to the Trigger frame to report on traffic differentiated via access categories (ACs). That is, the scheduler 190B of the HWD 150 may transmit an uplink (UL) frame in a format identified by the Trigger frame, as discussed further herein with reference to FIGS. 4A-4B and 5. In some embodiments, the scheduler 190A of the console 110 may acknowledge the response to the Trigger frame (e.g., acknowledge, block acknowledge, MU block acknowledge).

Figure 2:
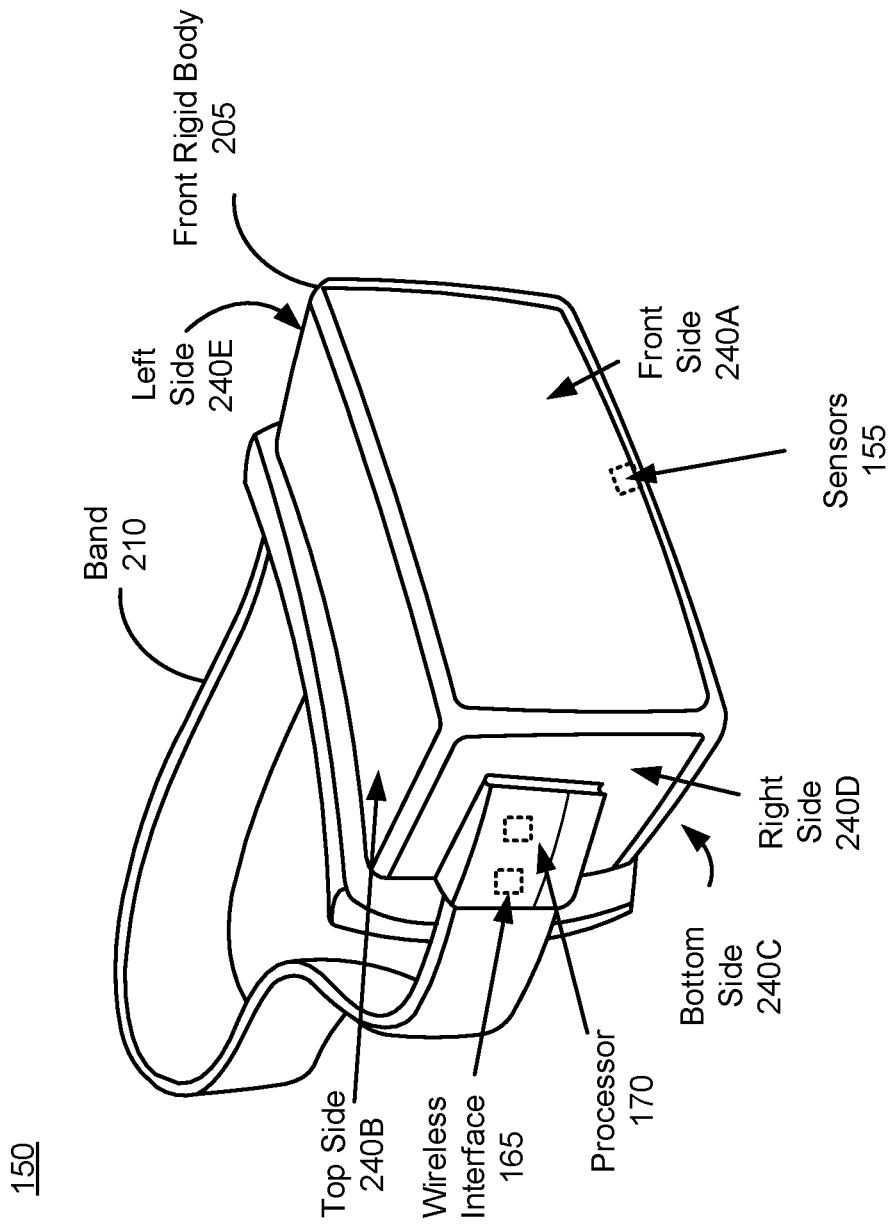
FIG. 2 is a diagram of a head wearable display, according to an example implementation of the present disclosure.

FIG. 2 is a diagram of a HWD 150, in accordance with an example embodiment. In some embodiments, the HWD 150 includes a front rigid body 205 and a band 210. The front rigid body 205 includes the electronic display 175 (not shown in FIG. 2), the lens 180 (not shown in FIG. 2), the sensors 155, the eye trackers 160A, 160B, the communication interface 165, and the image renderer 170. In the embodiment shown by FIG. 2, the sensors 155 are located within the front rigid body 205, and may not visible to the user. In other embodiments, the HWD 150 has a different configuration than shown in FIG. 2. For example, the image renderer 170, the eye trackers 160A, 160B, and/or the sensors 155 may be in different locations than shown in FIG. 2.

Figure 3:
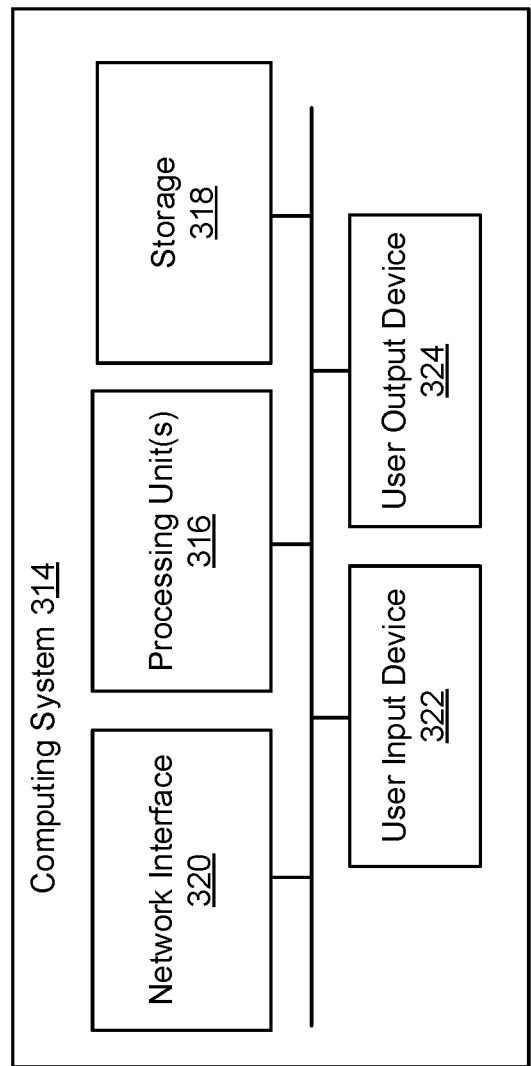
FIG. 3 is a block diagram of a computing environment according to an example implementation of the present disclosure.

Various operations described herein can be implemented on computer systems. FIG. 3 shows a block diagram of a representative computing system 314 usable to implement the present disclosure. In some embodiments, the console 110, the HWD 150 or both of FIG. 1 are implemented by the computing system 314. Computing system 314 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 314 can be implemented to provide VR, AR, MR experience. In some embodiments, the computing system 314 can include conventional computer components such as processors 316, storage device 318, network interface 320, user input device 322, and user output device 324.

Network interface 320 can provide a connection to a wide area network (e.g., the Internet) to which WAN interface of a remote server system is also connected. Network interface 320 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

The network interface 320 may include a transceiver to allow the computing system 314 to transmit and receive data from a remote device (e.g., an AP, a STA) using a transmitter and receiver. The transceiver may be configured to support transmission/reception supporting industry standards that enables bi-directional communication. An antenna may be attached to transceiver housing and electrically coupled to the transceiver. Additionally or alternatively, a multi-antenna array may be electrically coupled to the transceiver such that a plurality of beams pointing in distinct directions may facilitate in transmitting and/or receiving data.

A transmitter may be configured to wirelessly transmit frames, slots, or symbols generated by the processor unit 316. Similarly, a receiver may be configured to receive frames, slots or symbols and the processor unit 316 may be configured to process the frames. For example, the processor unit 316 can be configured to determine a type of frame and to process the frame and/or fields of the frame accordingly.

User input device 322 can include any device (or devices) via which a user can provide signals to computing system 314; computing system 314 can interpret the signals as indicative of particular user requests or information. User input device 322 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 324 can include any device via which computing system 314 can provide information to a user. For example, user output device 324 can include a display to display images generated by or delivered to computing system 314. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 324 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 316 can provide various functionality for computing system 314, including any of the functionality described herein as being performed by a server or client, or other functionality associated with message management services.

It will be appreciated that computing system 314 is illustrative and that variations and modifications are possible. Computer systems used in connection with the present disclosure can have other capabilities not specifically described here. Further, while computing system 314 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

FIGS. 1-2 illustrate devices that communicate traffic streams, some of which may be latency sensitive (e.g., those carrying AR/VR information/content). In some embodiments, devices (e.g., STAs, HWD 150, consoles 110, APs) may differentiate traffic streams using ACs. However, QoS data frames may contain traffic stream identifiers (TIDs) in a QoS subfield (e.g., a QoS control subfield). TIDs (one or multiple) may be mapped to one AC. Accordingly, differentiating traffic streams using ACs is a low resolution mechanism of differentiating traffic streams. In contrast, differentiating traffic streams using TIDs may be higher resolution (e.g., particular traffic streams are identified, resulting in higher resolution frame/link/slot prioritization, increasing/improving QoS). Various embodiments of providing a mechanism for a device (e.g., AP) to trigger based on TID will be described below with reference to FIGS. 4A to 7.

Figure 4A:
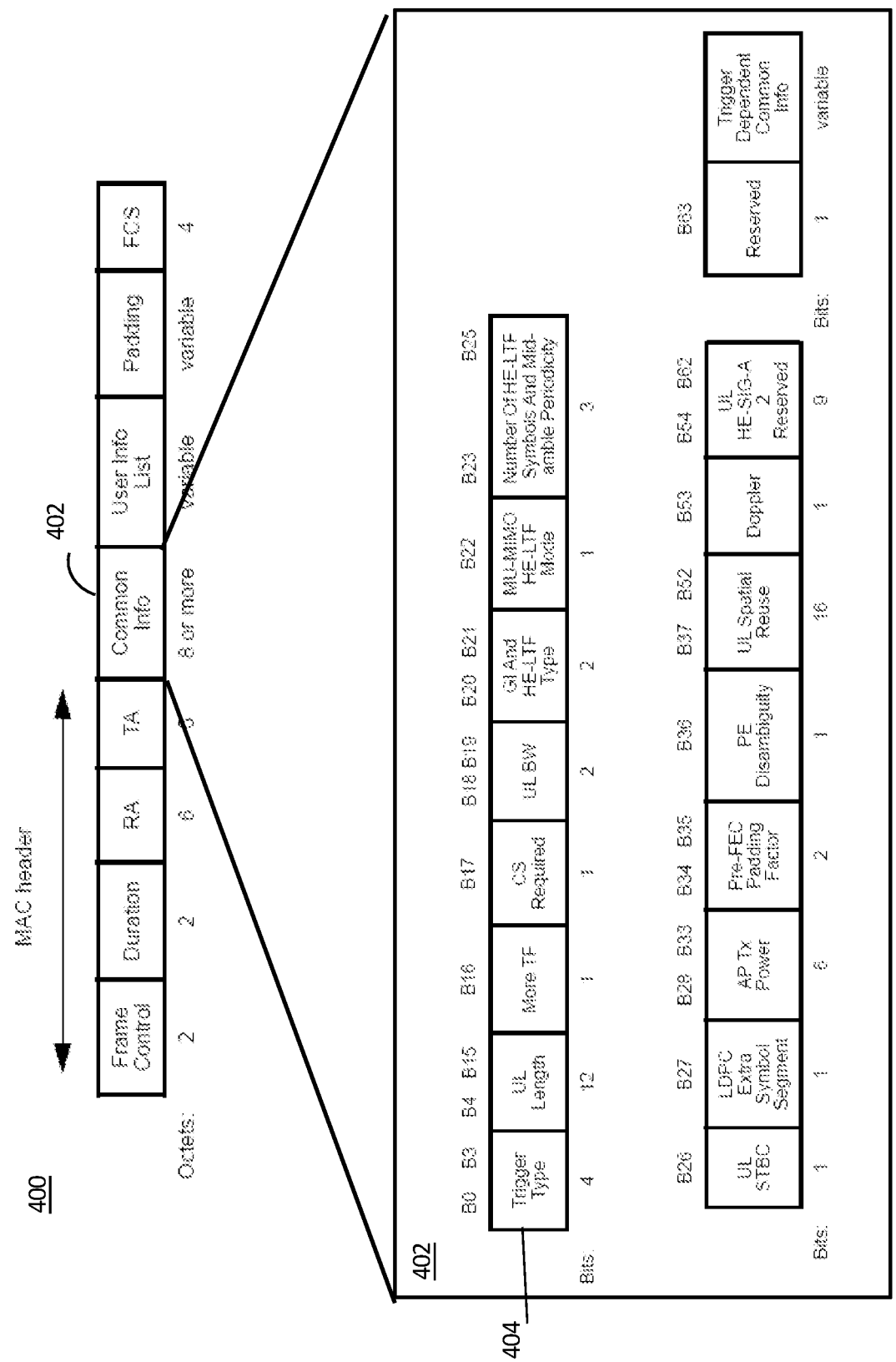
FIG. 4A illustrates an example trigger frame format and an example common information field format, according to an example implementation of the present disclosure.
Figure 4B:
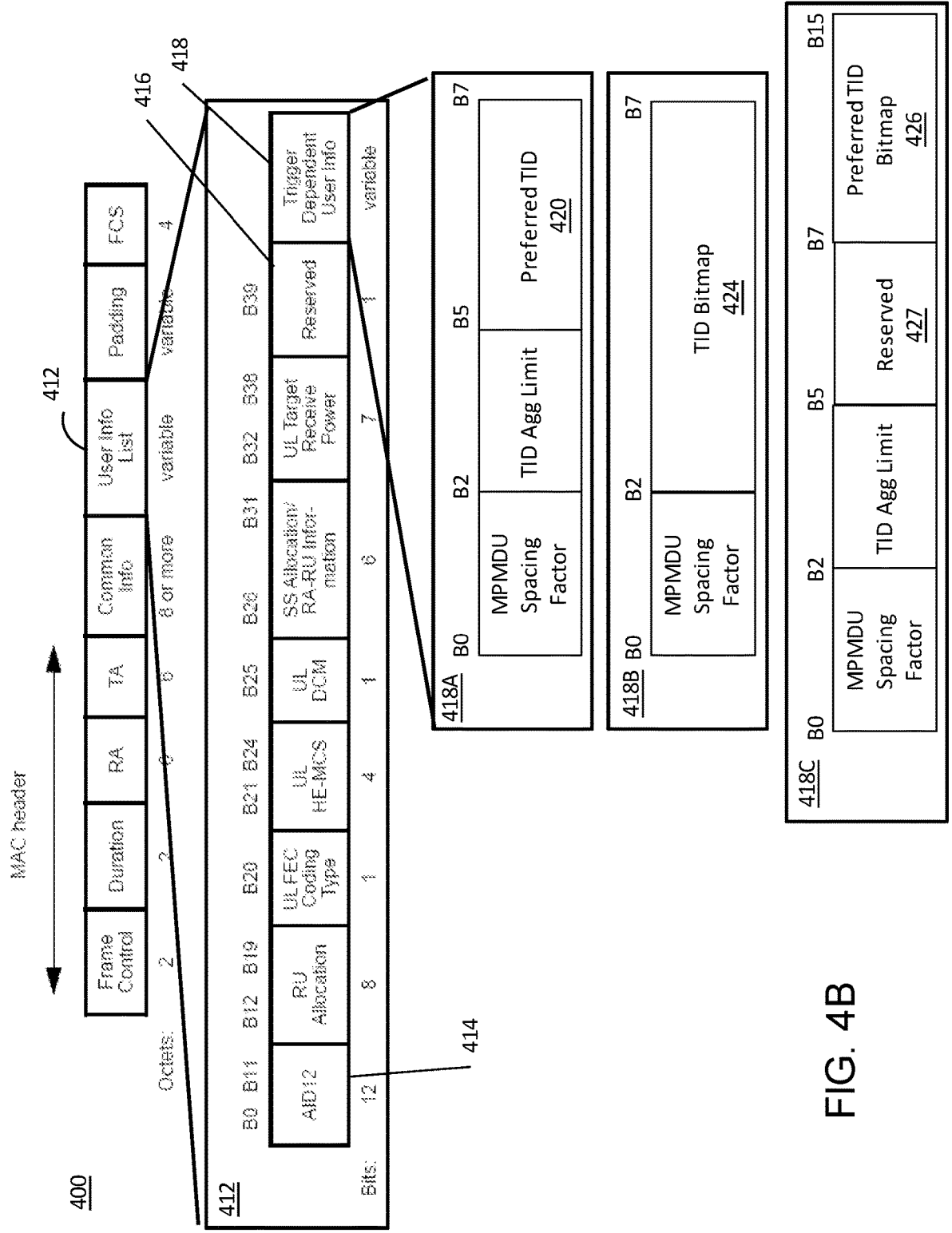
FIG. 4B illustrates an example trigger frame format and example user information field formats, according to example implementations of the present disclosure.

FIG. 4A illustrates an example Trigger frame format and an example common information field format, according to an example implementation of the present disclosure. FIG. 4B illustrates an example Trigger frame format and example user information field formats, according to example implementations of the present disclosure. FIG. 5 is a table of Trigger frame types/variants (e.g., encoding Trigger frame formats), according to an example implementation of the present disclosure.

Referring to FIG. 4A, illustrated is a Trigger frame format 400 and a common information field format 402. The common information field format 402 includes a Trigger frame type field 404. Referring to FIG. 5, illustrated is an example table 500 of trigger type subfield encoding. That is, the encoding values in table 500 may be set in the trigger type subfield 404 of FIG. 4.

Referring to FIG. 4B, illustrated is a Trigger frame format 400 and a user information field 412. A frame may be directed to a particular device if the device's association ID (AID) is indicated in the AID field 414 of the user information field 412. That is, each AID may represent a STA. In some embodiments, one or more reserved (or other) bits of the user information field 412 may be repurposed (e.g., re-used, reconfigured, or modified) to indicate a Trigger TID subfield 416. In some embodiments, if the Trigger TID subfield 416 is set to '1' (or '0') and the trigger type 404 in the common information field 402 (in FIG. 4A) is configured for a basic trigger type, then the Trigger Dependent User Information field 418 (or Trigger Type Dependent User Information Field) of the User Information Field 412 may be defined as shown in Trigger Dependent User Information field 418A. Trigger Dependent User Information field 418A illustrates one variant of a Trigger Dependent User Information field 418. It should be appreciated that each of the subfields in the Trigger Dependent User Information field 418 variants may be rearranged or renamed, or fields may be replaced, added, renamed, inserted, or deleted.

In one implementation, one or more bits in Trigger Dependent User Information field 418A may indicate prioritized TIDs (e.g., Preferred TIDs). For instance, bits 5-7 of the Trigger Dependent User Information field 418A may indicate a Preferred TID subfield 420. If the STA receives the Trigger frame with the Preferred TID subfield 420, the STA may transmit data to the AP, for instance, in high efficiency (or extremely high throughput) trigger based (TB) physical layer protocol data unit (PPDU) associated with one of the TIDs whose bit is set in the received Preferred TID subfield 420.

Additionally or alternatively, if the Trigger TID subfield 416 is set to '1' (or '0'), and the STA is configured for multi-TID aggregation (e.g., a multi-TID aggregation transmission support subfield in a Medium Access Control (MAC) capabilities field is set by the STA), and the Trigger Type 404 in the common field 402 (e.g., FIG. 4A) is configured for a basic trigger type, then the Trigger Dependent User Information Field 418 of the User Information Field 412 may be defined as shown in Trigger Dependent User Information field 418B. For example, one or more bits in the Trigger Dependent User Information Field 418 may be repurposed, reconfigured, re-used, modified, and/or inserted to indicate a TID Bitmap 424, as shown in Trigger Dependent User Information field 418B. If bit k of the TID Bitmap 424 is set, then TID k may be recommended for TID aggregation (e.g., TID aggregation of MAC Protocol Data Unit (MPDU) in the aggregated MPDU to be included in the high efficiency (HE) or extremely high throughput (EHT) TB-PPDU). For example, six bits (e.g., bits 2-7) may identify six TIDs belonging to AC_BE, AC_VI, and/or AC_VO. Accordingly, each bit of the TID Bitmap 424 may correspond to an ordered set of TIDs from bits 2-7 (excluding TIDs 0, 1 from AC_BK, for instance).

In other configurations, a new Trigger frame type format (e.g., a new Basic TID Trigger frame) may be encoded in the table 500 of FIG. 5. For example, one or more reserved bits (e.g., bits 8-15) may be associated with the new Trigger frame type. The new Trigger frame type format may indicate that one or more bits in the Trigger Dependent User Information field 418 may indicate/specify TIDs. For instance, bits 5-7 of the Trigger Dependent User Information field 418A may be a preferred TID subfield 420. Additionally or alternatively, a different variant of the Trigger Dependent User Information field 418, the Trigger Dependent User Information field 418C, may indicate TIDs using a TID bitmap 426. As shown, the Trigger Dependent User Information field 418C may be multiple bytes long (e.g., two octets, instead of one octet as shown in Trigger Dependent User Information field 418A and 418B). In an example, the TID Bitmap 426 may be 8 bits long (or some other amount of bits/bytes) and a reserved field 427 may be 3 bits long (or some other amount of bits/bytes).

Referring to FIGS. 4A-4B, in some embodiments, a basic Trigger frame may be extended using a reserved field (e.g., reserved field B39) of a per user info field (e.g., user information subfield 412) as a trigger TID subfield (e.g., Trigger TID subfield 416). The reserved field may have a size of one or more bits (e.g., 1 bit of the reserved field B39). The reserved field may be set to a value of 0 or 1. If the trigger TID subfield is set to 1, then a type dependent per user info field (e.g., Trigger Dependent User Information field 418A) for a basic trigger may be defined to have a Preferred TID subfield (e.g., Preferred TID 420) which has a size of three or more bits. Bit 5 to bit 7 of the Trigger Dependent User Information field 418A may correspond to the Preferred TID subfield, and bit 0 to bit 4 may correspond to subfields of MPDU multi-user (MU) spacing factor (2 bits) and/or TID Aggregation Limit (3 bits).

In some embodiments, if (1) the trigger TID subfield (e.g., Trigger TID subfield 416) is set to 1 and (2) a multi-TID Aggregation Tx Support subfield in a HE MAC Capabilities field is set to 0 by a STA, then the trigger dependent user info field (for the STA with its AID specified in AID12 field 414 of the user information subfield 412) for a basic trigger (e.g., Trigger Dependent User Information field 418B) may be defined to include a Preferred TID bitmap subfield (e.g., TID Bitmap 424) which has a size of six or more bits. Bit 2 to bit 7 of the Trigger Dependent User Information field 418B may correspond to the Preferred TID bitmap subfield, and bit 0 to bit 1 may correspond to a subfield of MPDU multi-user (MU) spacing factor (2 bits). Each bit of the TID Bitmap 424 may indicate (if set to 1) a corresponding one of 6 TIDs belonging to AC_BE (best effort), AC_VI (video), and AC_VO (voice). Each bit in the TID Bitmap 424 may correspond to an order set of TIDs from 2-7 (excluding TIDs 0, 1 from AC_BK (background)). An example of encoding of the TID Bitmap 424 is shown in Table 1.

In some embodiments, a QoS-data frame may be triggered based on TID(s) specified in at least one of a Preferred TID subfield (e.g., Preferred TID 420) or a Preferred TID bitmap subfield (e.g., TID Bitmap 424) defined in a basic Trigger frame. For example, upon receiving a Trigger frame (TF) with the Preferred TID bitmap subfield, a STA may send data in HE or EHT TB PPDU from one of the TIDs whose bit is set in the received Preferred TID bitmap subfield.

In some embodiments, a basic Trigger frame may be extended by defining a new Trigger frame type, e.g., a basic TID Trigger frame. The basic TID Trigger frame may include a Trigger Type subfield (e.g., Triger Type subfield 404 in the common information field format 402) which may be set to a value not used by other (existing) Trigger frame types (e.g., set to 8 which is not used in the table 500 in FIG. 5). The frame format of the basic TID Trigger frame may be the same as that of the basic Trigger frame except that a Preferred TID subfield is defined in the type dependent per user info subfield (e.g., Trigger Dependent User Information field 418A).

In some embodiments, a basic TID Trigger frame, whose Trigger Type subfield is set to a value not used by other (existing/defined) Trigger frame types (e.g., set to 9 which is not used in the table 500 in FIG. 5), may include a Preferred TID bitmap subfield in the type dependent per user info subfield (e.g., Trigger Dependent User Information field 418C). In some embodiments, the frame format of the basic TID Trigger frame may be the same as that of the basic Trigger frame except that the type dependent per user info subfield may be 2 octets (B0-B15 of Trigger Dependent User Information field 418C), bit 5 to bit 7 may be defined as reserved (e.g., reserved field 427), and bit 8 to bit 15 may be defined as the Preferred TID bitmap subfield (e.g., TID Bitmap 426). In some embodiments, bit 8 to bit 15 of the type dependent per user info subfield may correspond to the Preferred TID bitmap subfield (e.g., TID Bitmap 426), bit 5 to bit 7 of the type dependent per user info subfield may correspond to the reserved subfield (e.g., reserved field 427), and bit 0 to bit 4 of the type dependent per user info subfield may correspond to MPDU MU spacing factor (2 bits) and/or TID Aggregation Limit (3 bits). In the Preferred TID bitmap subfield (e.g., TID Bitmap 426), if bit-k is set to 1 (k=0, . . . , 7), then TID k may be a recommended TID for aggregation of MPDUs in an Aggregate MAC Protocol Data Unit (A-MPDU) to be included in the HE or EHT TB-PPDU.

In some embodiments, a QoS-data frame may be triggered using a newly defined basic TID Trigger frame instead of a basic Trigger frame. A QoS-data frame may be triggered based on TID(s) specified in the basic TID Trigger frame (e.g., TID(s) specified in at least one of Preferred TID 420 or TID Bitmap 426 depending on the frame format of the basic TID Trigger frame). For example, upon receiving a basic TID Trigger frame with the TID Bitmap 426, a STA may send data in HE or EHT TB PPDU from one of the TIDs whose bit is set in the received TID Bitmap 426.

Figure 6B:
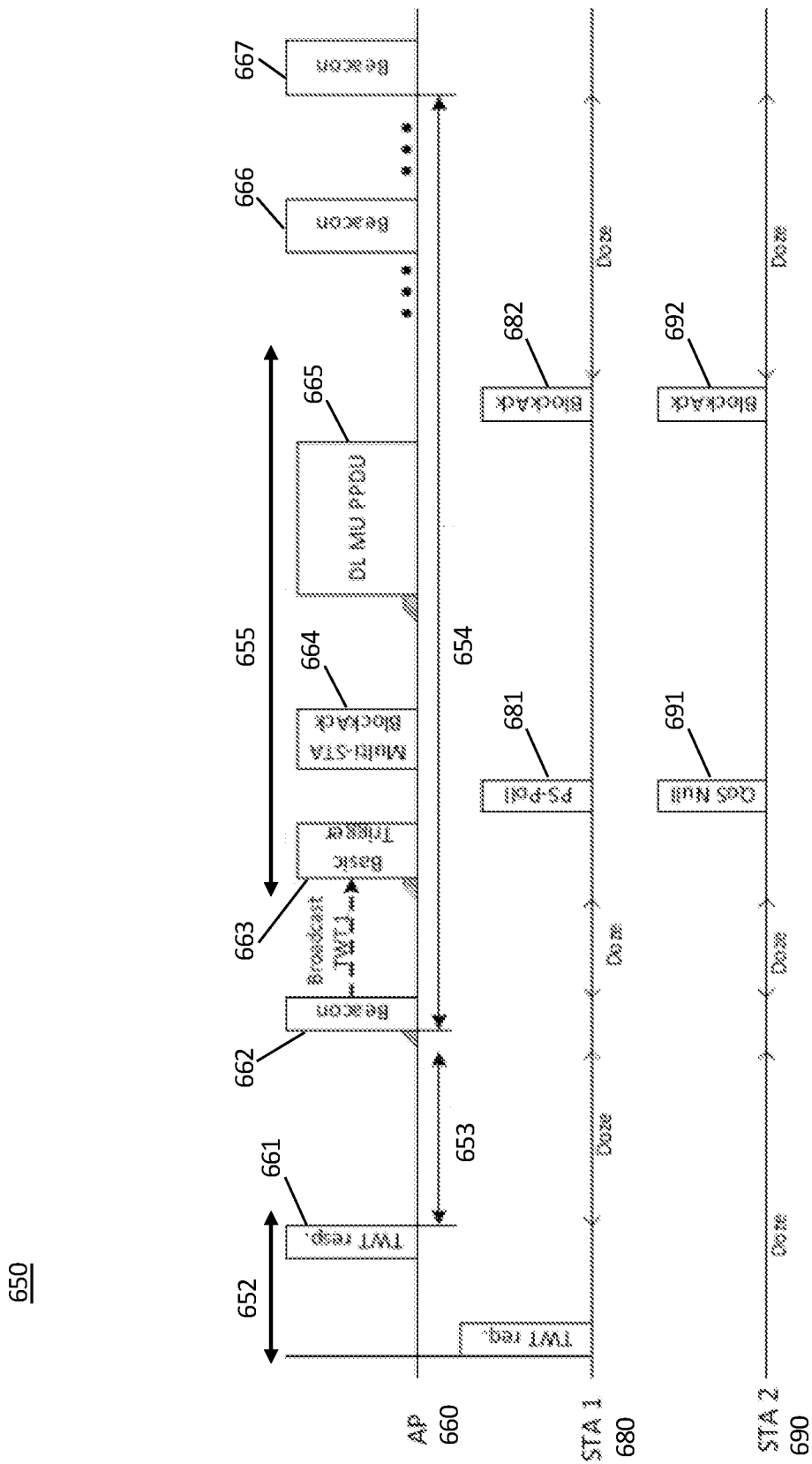

FIGS. 6A-6B are timing diagrams each showing a wake-up/sleep schedule of a computing device utilizing target wake time (TWT), according to an example implementation of the present disclosure.

In different embodiments, TID information may be implicitly communicated during a duration of time. For example, the TWT is a time agreed/negotiated upon by devices (e.g., an AP and STA), or specified/configured by one device (e.g., an AP). During the wake time, a first device (e.g., a STA) may be in an awake state (e.g., its wireless communication module/interface is in a fully powered-up ready, or wake state) and is able to transmit and/or receive. When the first device is not awake (e.g., its wireless communication module/interface is in a powered-down, low power, or sleep state), the first device may enter a low power model or other sleep mode. The first device may exist in the sleep state until a time instance/window as specified by the TWT. The first device may also wake up periodically (e.g., at a fixed, configured time interval/period/cycle) based on the TWT. The TWT reduces energy consumption of the first device by limiting the awake time and associated power consumption of the first device An AP may enhance medium access protection and resource reservation by supporting restricted TWT (rTWT). The rTWT SPs may deliver latency sensitive traffic and/or any additional frame that supports latency sensitive traffic. Example frames that may be transmitted during a broadcast TWT SP by a TWT scheduling AP or by a TWT scheduled STA may include PS-Poll and QoS Null frames, frame exchanges for delivery of QoS data frames of TIDs, bandwidth query report frames (BQRs), buffer status report (BSR) frames, frames that may be sent as part of a sounding feedback exchange, management frames (e.g., action or action No acknowledge (ACK) frames), and control response frames.

In some embodiments, when a rTWT agreement is established, one or more TIDs may be associated with both UL and/or DL traffic. Accordingly, when an AP triggers a STA during a rTWT SP, the AP may trigger specific TIDs that are associated with the rTWT agreement.

A TWT (or rTWT) may be characterized by a periodic, fixed, wake-sleep schedule. FIG. 6B is a timing diagram 650 showing a wake-up/sleep schedule of a computing device utilizing TWT, according to an example implementation of the present disclosure. The TWT start time is indicated by the first device (e.g., a portion of its relevant modules/circuitry) waking up at 602. The first device may wake up for a duration 604 defined by a service period (SP). After the SP duration 604, the first device may enter a sleep state until the next TWT start time at 608. The interval of time between TWT start time 602 and TWT start time 608 may be considered the SP interval 606.

In some embodiments, TIDs may be associated with a TWT agreement. FIG. 6B is a timing diagram 600 showing a basic Trigger frame transmitted during a TWT service period (SP), according to an example implementation of the present disclosure. Referring to FIG. 6B, a first device 680 (STA1) sends a TWT request 661 to an AP 660 to perform target beacon transmission time (TBTT) negotiation during a negotiation period 652. The AP 660 may send a TWT response 661 to the first device 680 to determine a first TBTT 653 and a listen interval 654. The AP 660 may send a beacon 662, 666, 667 containing instructions for a broadcast TWT session. During a TWP SP 655, the AP 660 may send a basic Trigger frame 663 based on one or more preferred or prioritized TIDs to be associated with traffic. For example, prioritized TIDs may be implicitly indicated during the TWP SP. In a particular example, basic Trigger frames transmitted/received during an R-TWT SP may use one or more bits to indicate preferred TIDs. For example, bits 5-7 in the Trigger Dependent User Information Field 418 may be set to (or interpreted as) the Preferred TID Subfield (e.g., Preferred TID subfield 420 in Trigger Dependent User Information Field 418A in FIG. 4B). Accordingly, the timing of the frame sequence (e.g., during an R-TWT SP) may indicate whether bits in the Trigger Dependent User Information Field 418 should be interpreted as the Preferred TID Subfield. Using the combination of the frame sequence and timing, the AP may learn the TIDs (and buffer status of the TIDs, for instance) associated with the TWT agreement. In response to the basic Trigger frame 663, the first device 680 may send a PS-Poll frame 681, and a second device 690 may send a QoS Null frame 691. The AP 660 may respond to the PS-Poll frame and the QoS Null frame 691 using multi-STA block acknowledgement frame 664. The AP 660 may transmit DL MU PPDU 665 to the first and second devices, which in response may send block acknowledgment frames 682, 692.

Referring to FIGS. 6A and 6B, in some embodiments, a basic Trigger frame (e.g., Trigger frame 664) may implicitly indicate a preferred TID during a TWT SP (e.g., TWT SP 655). When a basic Trigger frame is transmitted or received during a TWT SP, a particular portion of the type dependent per user info field of the basic Trigger frame (e.g., Preferred TID subfield 420 in Trigger Dependent User Information Field 418A in FIG. 4B) may be set to (or interpreted as) a value indicating a preferred TID, so that upon receiving the basic Trigger frame with the particular portion of the type dependent per user info field, a STA may send QoS data from the preferred TID set in the received particular portion. In some embodiments, the particular portion may correspond to bit 5 to bit 7 in the type dependent per user info field.

Figure 7:
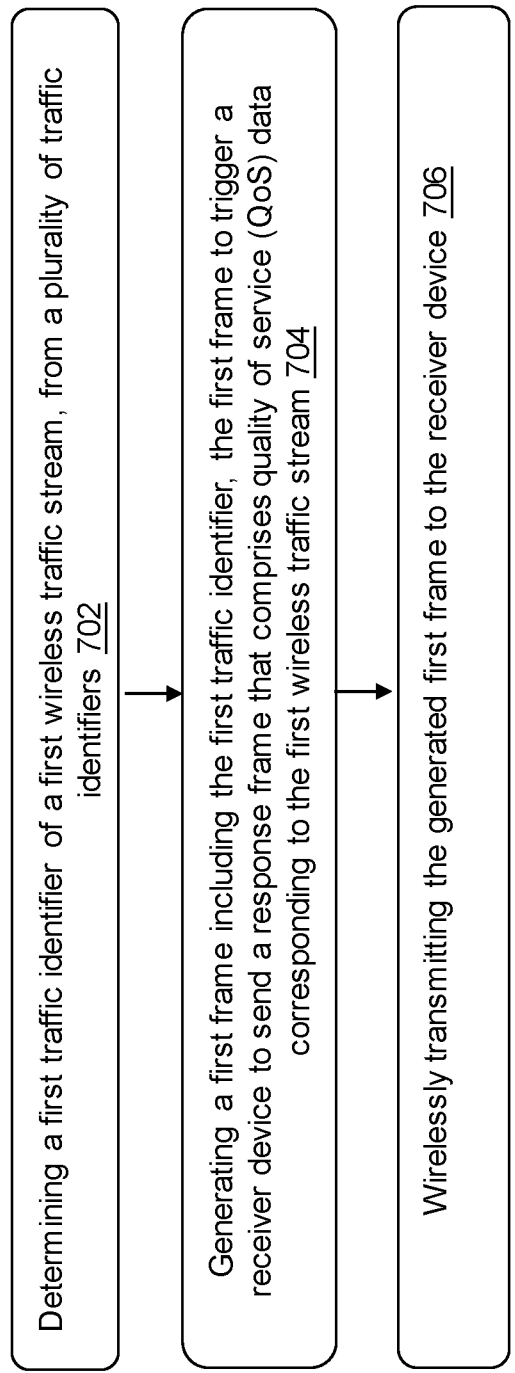
FIG. 7 is a flowchart showing a process of triggering reporting for transmission streams, according to an example implementation of the present disclosure.

FIG. 7 is a flowchart showing a process 700 of triggering reporting for transmission streams, according to an example implementation of the present disclosure. In some embodiments, the process 700 is performed by a first device (e.g., Console 110 or HWD 150). In some embodiments, the process 700 is performed by other entities. In some embodiments, the process 700 includes more, fewer, or different steps than shown in FIG. 7.

In one approach, the first device may determine 702 a first traffic identifier of a first wireless traffic stream (e.g., one or more particular TIDs associated with one or more traffic categories; see Table 1), from a plurality of traffic identifiers (e.g., a plurality TIDs shown in the right column of Table 1).

In one approach, the first device may generate 704 a first frame including the first traffic identifier (e.g., a Trigger frame including one or more particular TIDs set in one of subfields of Preferred TID subfield 420, TID Bitmap 424, or TID bitmap 426). The first frame may be to trigger a receiver device to send a response frame that comprises quality of service (QoS) data corresponding to the first wireless traffic stream.

In some embodiments, in generating the first frame, the first device may determine whether a first field of the first frame (e.g., Trigger TID subfield 416) is set to a first value (e.g., value of 1). In response to determining that the first field is set to the first value, the first device may set a second field of the first frame (e.g., Preferred TID subfield 420) to indicate the first traffic identifier. The first field may be a subfield of a user information field (e.g., user information field 412) that is associated with a particular user or the receiving device (e.g., user or device associated with AID subfield 414). In generating the first frame, the first device may determine whether a third field of the first frame (e.g., multi-TID Aggregation Tx Support subfield in a HE MAC Capabilities field) is set to a second value (e.g., value of 0). In response to determining that the first field is set to the first value and the third field is set to the second value (e.g., Trigger TID subfield 416 is set to 1 and TID Aggregation Tx Support subfield in a HE MAC Capabilities field is set to 0), the first device may set a first bit of a fourth field of the first frame (e.g., TID bitmap 424) to indicate the first traffic identifier. The fourth field of the first frame may include a plurality of bits each corresponding to a traffic identifier associated with one of a plurality of traffic categories (e.g., AC_BE, AC_VI, AC_VO).

In some embodiments, in generating the first frame, the first device may set a frame type field of the first frame (e.g., Trigger frame type field 404) to a first type indicating a Trigger frame including one or more traffic identifiers (e.g., new Trigger frame type which is not used in the table 500 in FIG. 5), and set a traffic identifier field of the first frame (e.g., Preferred TID subfield 420) to the first traffic identifier.

In some embodiments, in generating the first frame, the first device may set a frame type field of the first frame (e.g., Trigger frame type field 404) to a second type indicating a Trigger frame including one or more traffic identifiers (e.g., new Trigger frame type which is not used in the table 500 in FIG. 5), and set a first bit of a traffic identifier bitmap field of the first frame (e.g., TID Bitmap 426) to indicate the first traffic identifier. The traffic identifier bitmap field of the first frame may include a plurality of bits (e.g., B7-B15 of TID Bitmap 426) each corresponding to a traffic identifier associated with one of a plurality of traffic categories.

In some embodiments, in generating the first frame, the first device may set a second field of the first frame (e.g., Preferred TID subfield 420 in Trigger Dependent User Information Field 418A in FIG. 4B) to the first traffic identifier, when the first frame (e.g., basic Trigger frame 663 in FIG. 6B) is to be wirelessly transmitted during a service period (e.g., TWT SP 655 in FIG. 6B) of a target wake time (TWT) schedule. The TWT schedule may be a restricted TWT schedule.

In one approach, the first device (e.g., AP 660 in FIG. 6B) may wirelessly transmit 706, via a transmitter (e.g., network interface 320), the generated first frame to the receiver device (e.g., STA1 680, STA2 690 in FIG. 6B).

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A device comprising:
    one or more processors configured to:
        determine a first traffic identifier of a first wireless traffic stream, from a plurality of traffic identifiers;
        generate a first frame including the first traffic identifier, the first frame to trigger a receiver device to send a response frame that comprises quality of service (QOS) data corresponding to the first wireless traffic stream; and
        wirelessly transmit, via a transmitter, the generated first frame to the receiver device,
        wherein in generating the first frame, the one or more processors are configured to:
            determine whether a first field of the first frame is set to a first value; and
            in response to determining that the first field is set to the first value, set a second field of the first frame to indicate the first traffic identifier.

2. The device according to claim 1, wherein the first field is a subfield of a user information field that is associated with a particular user or the receiving device.

3. The device according to claim 1, wherein in generating the first frame, the one or more processors are configured to:
    determine whether a third field of the first frame is set to a second value; and
    in response to determining that the first field is set to the first value and the third field is set to the second value, set a first bit of a fourth field of the first frame to indicate the first traffic identifier.

4. The device according to claim 3, wherein the fourth field of the first frame comprises a plurality of bits each corresponding to a traffic identifier associated with one of a plurality of traffic categories.

5. The device according to claim 1, wherein in generating the first frame, the one or more processors are configured to:
    set a frame type field of the first frame to a type indicating a trigger frame including one or more traffic identifiers; and
    set a traffic identifier field of the first frame to the first traffic identifier.

6. The device according to claim 1, wherein in generating the first frame, the one or more processors are configured to:
    set a frame type field of the first frame to a type indicating a trigger frame including one or more traffic identifiers; and
    set a first bit of a traffic identifier bitmap field of the first frame to indicate the first traffic identifier.

7. The device according to claim 6, wherein the traffic identifier bitmap field of the first frame comprises a plurality of bits each corresponding to a traffic identifier associated with one of a plurality of traffic categories.

8. The device according to claim 1, wherein in generating the first frame, the one or more processors are configured to:
    set a second field of the first frame to the first traffic identifier, when the first frame is to be wirelessly transmitted during a service period (SP) of a target wake time (TWT) schedule.

9. The device according to claim 8, wherein the TWT schedule is a restricted TWT schedule.

10. A method comprising:
    determining, by a first device, a first traffic identifier of a first wireless traffic stream, from a plurality of traffic identifiers;
    generating a first frame including the first traffic identifier, the first frame to trigger a receiver device to send a response frame that comprises quality of service (QOS) data corresponding to the first wireless traffic stream; and
    wirelessly transmitting, via a transmitter, the generated first frame to the receiver device,
    wherein generating the first frame comprises:
        determining whether a first field of the first frame is set to a first value; and
        in response to determining that the first field is set to the first value, setting a second field of the first frame to indicate the first traffic identifier.

11. The method according to claim 10, wherein the first field is a subfield of a user information field that is associated with a particular user or the receiving device.

12. The method according to claim 10, wherein generating the first frame comprises:
    determining whether a third field of the first frame is set to a second value; and
    in response to determining that the first field is set to the first value and the third field is set to the second value, setting a first bit of a fourth field of the first frame to indicate the first traffic identifier.

13. The method according to claim 12, wherein the fourth field of the first frame comprises a plurality of bits each corresponding to a traffic identifier associated with one of a plurality of traffic categories.

14. The method according to claim 10, wherein generating the first frame comprises:
    setting a frame type field of the first frame to a first type indicating a trigger frame including one or more traffic identifiers; and
    setting a traffic identifier field of the first frame to the first traffic identifier.

15. The method according to claim 10, wherein generating the first frame comprises:
    setting a frame type field of the first frame to a type indicating a trigger frame including one or more traffic identifiers; and
    setting a first bit of a traffic identifier bitmap field of the first frame to indicate the first traffic identifier.

16. The method according to claim 15, wherein the traffic identifier bitmap field of the first frame comprises a plurality of bits each corresponding to a traffic identifier associated with one of a plurality of traffic categories.

17. The method according to claim 10, wherein generating the first frame comprises:
    setting a second field of the first frame to the first traffic identifier, when the first frame is to be wirelessly transmitted during a service period (SP) of a target wake time (TWT) schedule.

18. The method according to claim 17, wherein the TWT schedule is a restricted TWT schedule.

* * * * *